United States Patent [19]
Johnston

[11] Patent Number: 5,305,912
[45] Date of Patent: Apr. 26, 1994

[54] GRANULAR MATERIAL FLOW DIVIDER

[76] Inventor: Robert E. Johnston, 630 8th St., SE., P.O. Box 495, Altoona, Iowa 50009

[21] Appl. No.: 975,066

[22] Filed: Nov. 12, 1992

[51] Int. Cl.$^5$ .......................................... B65D 88/54
[52] U.S. Cl. ...................................... 222/1; 222/330; 222/410
[58] Field of Search .................... 222/1, 330, 410, 457

[56] References Cited

U.S. PATENT DOCUMENTS

| | | | |
|---|---|---|---|
| 1,348,885 | 8/1920 | Laffoon . | |
| 1,953,928 | 4/1934 | Colyer | 226/102 |
| 2,601,534 | 6/1952 | Laffoon | 222/330 |
| 2,703,648 | 3/1955 | Stucheli | 209/254 |
| 3,399,771 | 9/1968 | Hryniowski | 209/245 |
| 3,512,680 | 5/1970 | Krolopp | 222/1 |
| 3,877,587 | 4/1975 | Ishizaki | 222/410 X |
| 4,024,985 | 5/1977 | Iinoya et al. | 222/410 X |

Primary Examiner—Gregory L. Huson
Attorney, Agent, or Firm—Morton S. Adler

[57] ABSTRACT

Apparatus and method to move granular materials in an even flow by centrifugal force from a rotating surface to a plurality of circumferentially arranged receiving points includes a rotatable inverted cone provided with a peripheral base flange and having an angle of inclination of the cone surface matching the angle of repose for the material to be distributed. Material delivered to the apex of the cone flows by gravity down the cone surface to establish the angle of repose for such material with a toe point at the flange where it comes to rest when the cone is stationary. A cylindrical hopper, to accumulate material from the cone, is vertically adjustably secured to the flange so that the bottom of the hopper is spaced above the flange to define a flow passageway which can be enlarged or reduced by vertical adjustment of the hopper relative to the flange. Rotation of the cone at a relative slow speed creates a sufficient centrifugal impulse at the toe point to initiate material movement at such point over the flange into the receiving points as the angle of repose continually moves to correct itself. The size of the flow passageway provides a means to precisely control the volume of material flow off of said flange at any selected time by not only adjusting such size but also by selectively increasing and decreasing the speed of rotation relative to such adjustments.

14 Claims, 6 Drawing Sheets

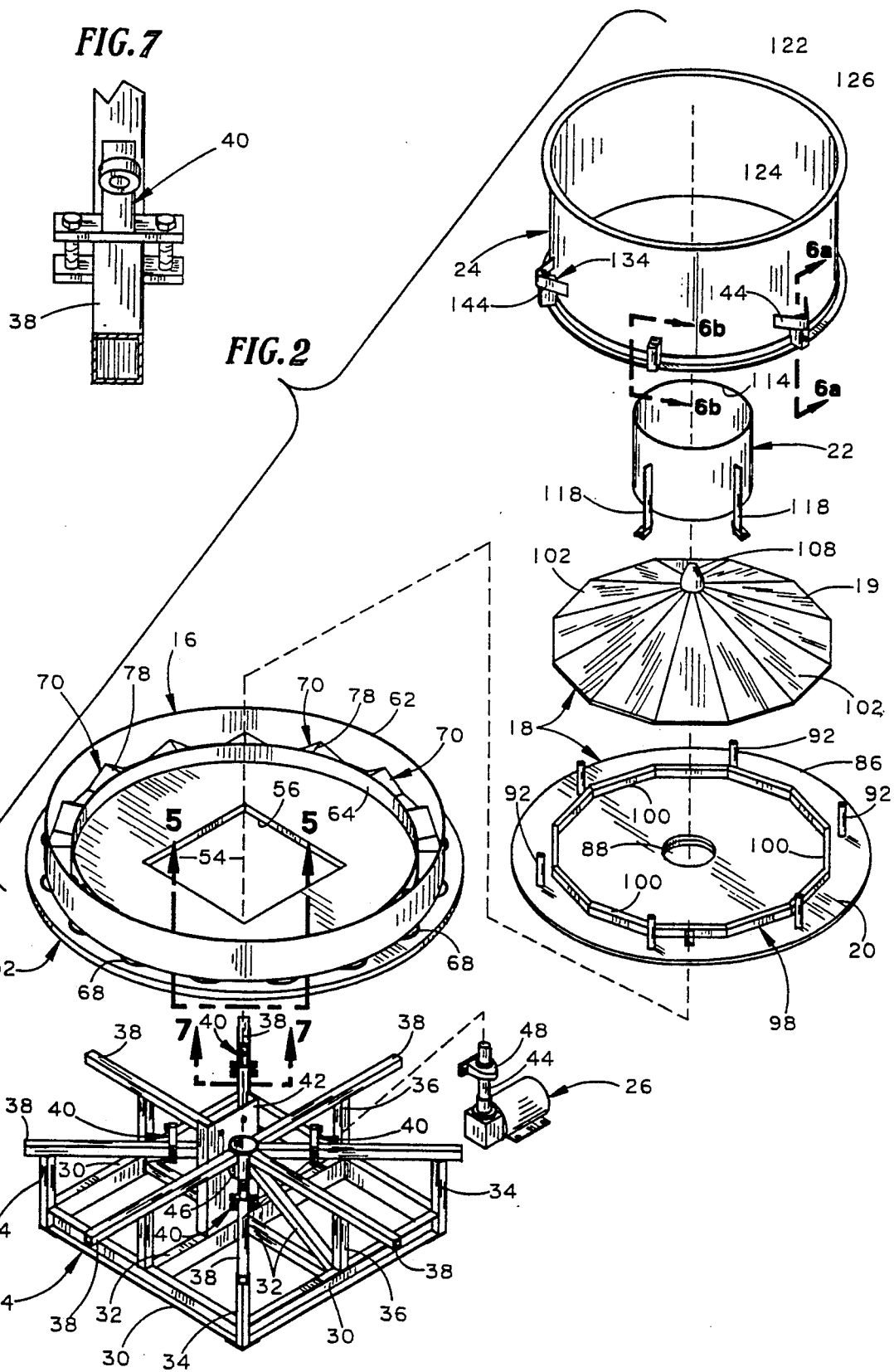

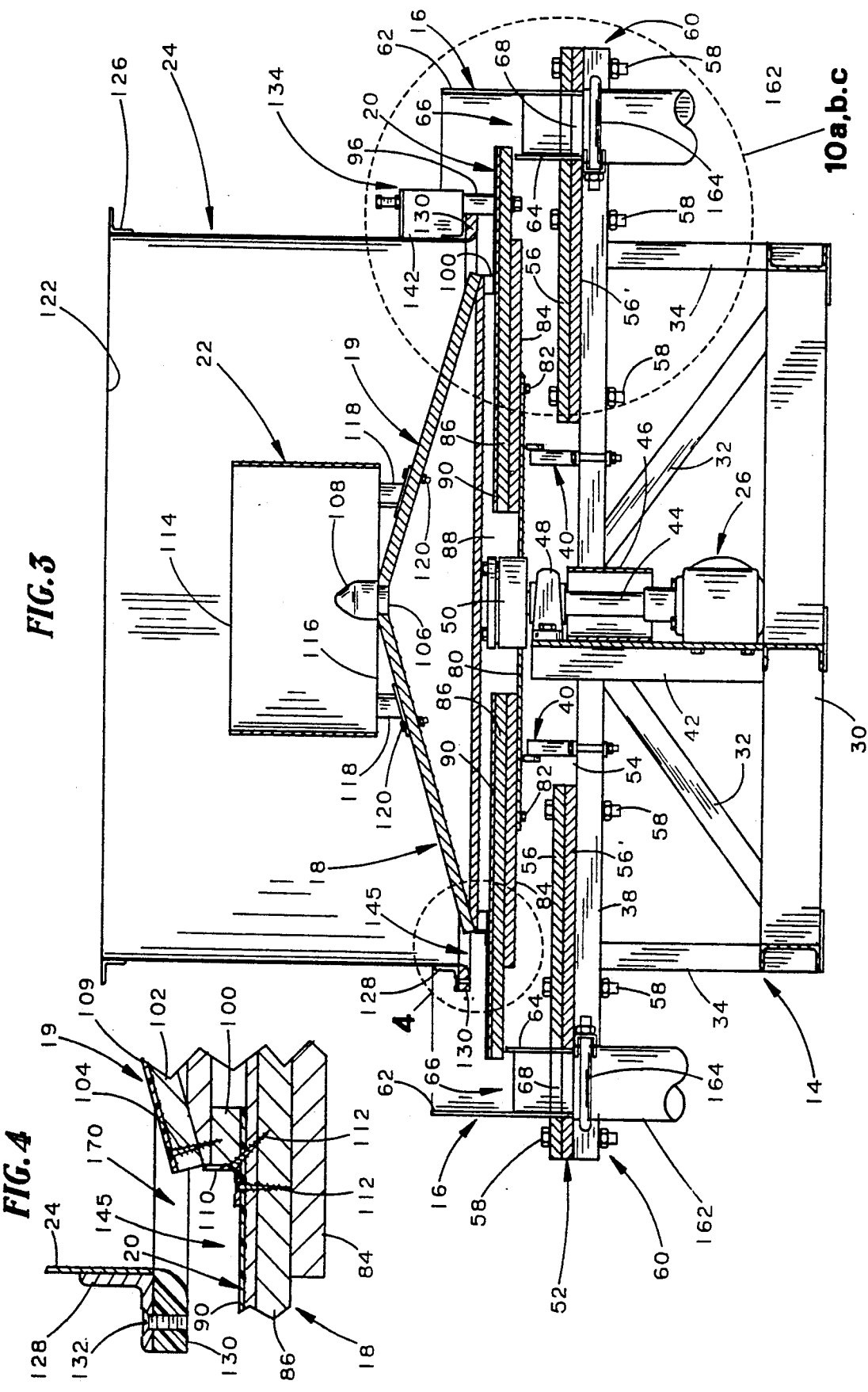

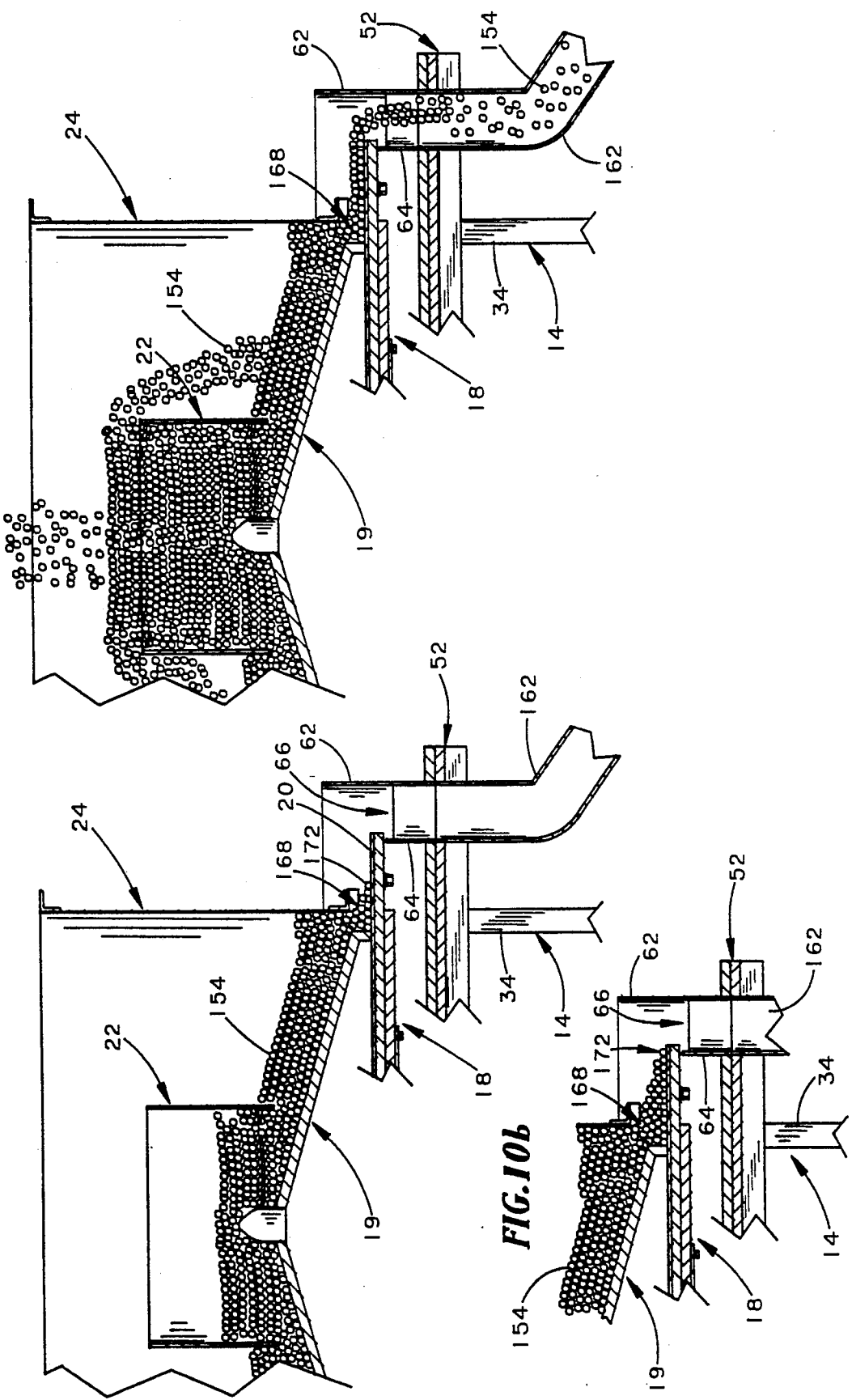

GRANULAR MATERIAL FLOW DIVIDER

BACKGROUND OF THE INVENTION

This invention relates to improvements in apparatus and methods that utilize centrifugal force for distributing granular materials in an even flow over the edge of a rotating surface to a plurality of circumferentially disposed receiving points.

Such types of apparatus are disclosed in many prior devices in a variety of forms in an environment where material is delivered to the axial area of a rotatable disc which is rotated at a speed fast enough to create a centrifugal force of sufficient impulse to urge such material centrifugally outwardly from the axial area towards and over the edge of the disc to a receiving point. In some instances, the movement of material is assisted by spider arrangements, agitators and valves and, because of the substantial centrifugal force required to move the material from the axial area to the edge of the disc, the use of a centering hopper attached to the disc for rotation therewith, has been used to impart some initial motion to the material delivered to the disc through such hopper. With such types of apparatus that use the rotating disc, it is well known that at any given speed of rotation, the centrifugal speed and impulse will be much greater at the perimeter than at the axis so that in such apparatus, the speed of rotation required to produce a centrifugal impulse sufficient to get the material in motion from the axial area and move it across the surface of the disc to and over the discharge edge thereof results in such a substantially greater centrifugal force and speed at the discharge edge that any precise control of the speed and volume of material flow to points of receipt is extremely difficult and is a serious disadvantage of known devices.

With the above observations in mind, it is one of the important objects of this invention to overcome the disadvantage noted and to provide a material distributor for moving granular materials over the edge of a rotating member to selected receiving points during which the speed and volume of material being moved can be precisely controlled.

Another object herein is to provide apparatus and method of the above class in which granular material is delivered to the peripheral area of a rotatable surface and is moved centrifugally outwardly from said area to selected receiving points by rotating said surface at a speed only sufficient to initiate movement of said material at said peripheral area.

SUMMARY

Apparatus and method to move granular materials in an even flow by centrifugal force from a rotating surface to a plurality of circumferentially arranged receiving points includes a rotatable inverted cone provided with a peripheral base flange. The angle of slope of the cone surface from its apex to the base flange is made to match the angle of repose for the material to be processed. Material is received into a cushioning hopper, attached to the for rotation therewith so that it will fall therefrom by gravity first onto the apex of the cone and then down the cone surface to form the angle of repose for such material and establish a toe point on said flange where it comes to rest when the cone is stationary. Overflow from the cushioning hopper enters a concentrically larger surge hopper, also attached to the cone for rotation therewith, in spaced relationship above the base flange to form a flow passageway where such overflow joins the material flowing from the cushioning hopper down the cone surface to the angle of repose. Rotation of the cone at a relative slow speed creates a sufficient centrifugal impulse at the base flange to move the material over such flange as the angle of repose continually moves to correct itself, to produce an even flow of the material to the multiple receiving points. Vertical adjustment of surge hopper relative to the base flange, and speed control of the cone rotation provide respective means for precise control for changes in the speed and volume of delivery of the material to the receiving points.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 2 is an exploded view of FIG. 1, FIG. 3 is a cross sectional view taken on the line 3—3 of FIG. 1, FIG. 4 is a fragmentary enlarged detail view of the dotted circle line area 4 in FIG. 3, FIG. 7 is a perspective view of one of several support rollers taken on the line 7—7 in FIG. 2.

DESCRIPTION OF THE PREFERRED EMBODIMENTS

Figure 1:
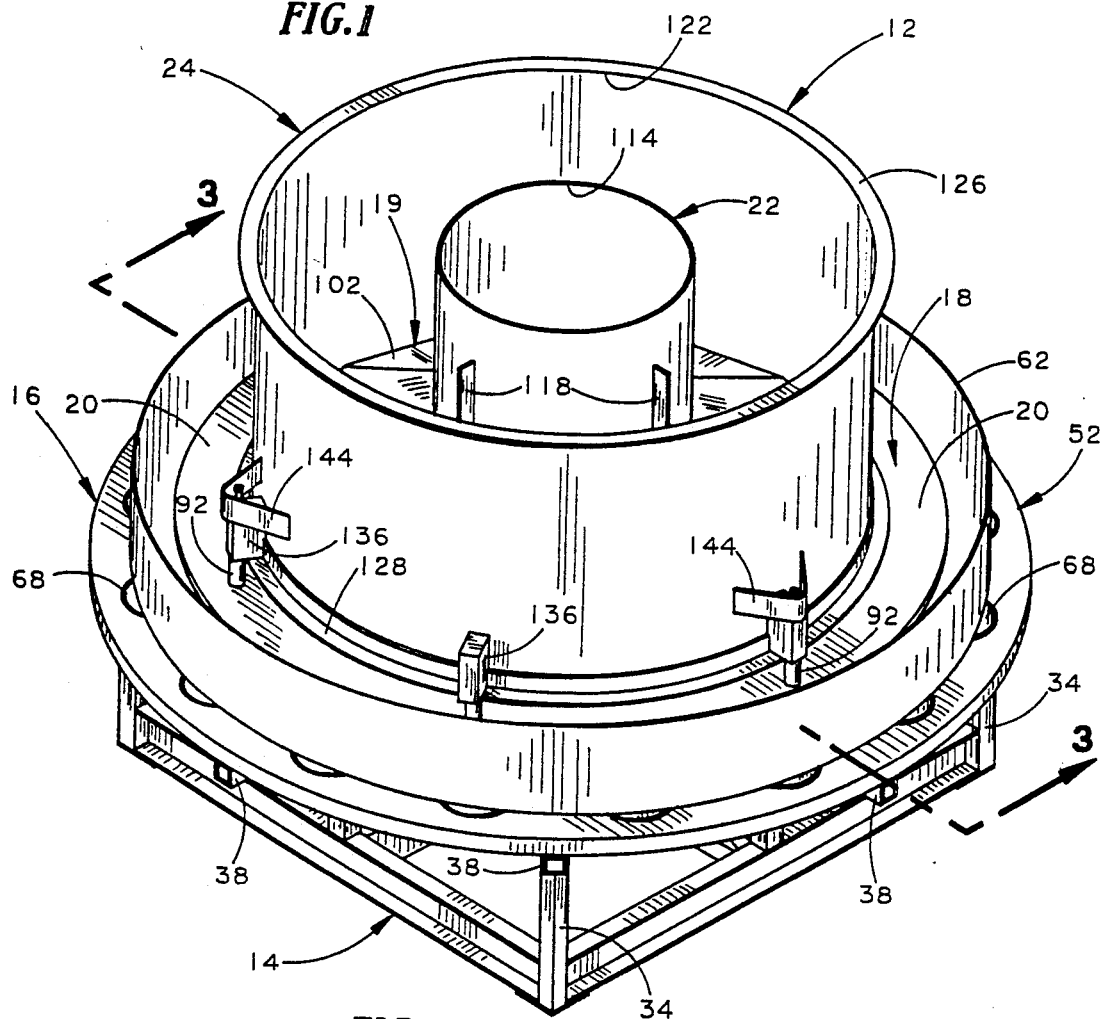
FIG. 1 is a perspective view of a distributor for granular materials embodying this invention.

Referring to the drawings, this invention, designated by the numeral 12 as best seen in FIG. 1, includes, in general, (FIG. 2) a support base 14, a material splitter or divider assembly 16 attached to base 14, a rotatable assembly 18, which includes an inverted cone 19 having a peripheral base flange 20, mounted to base 14, a material receiving cushioning hopper 22 mounted to cone 19, a surge hopper 24 mounted to assembly 18, and a motor assembly 26 (FIG. 3) on base 14 for rotating assembly 18, all adapted for use with a receiving bin assembly 28 (FIG. 8), and all of which is more specifically described as follows.

With reference more particularly to FIGS. 2, 3, base 14 is generally a square frame formed by the connection of four like bottom rails of steel channel 30 reinforced by suitable braces 32. Upstanding corner posts 34 on base 14, and like posts 36 intermediate posts 34, are provided to support a plurality of upper horizontal rails 38 disposed in a spoke-like configuration as shown. A plurality of equally spaced upstanding rollers 40 (FIG. 7) are secured to selected rails 38 for association with assembly 18 as will appear. Motor assembly 26 is suitably mounted centrally of base 14 to a vertical support 42 so that the motor shaft 44 is vertically disposed and extends upwardly through housing 46 through the pillow block 48 to hub 50.

Figure 5:
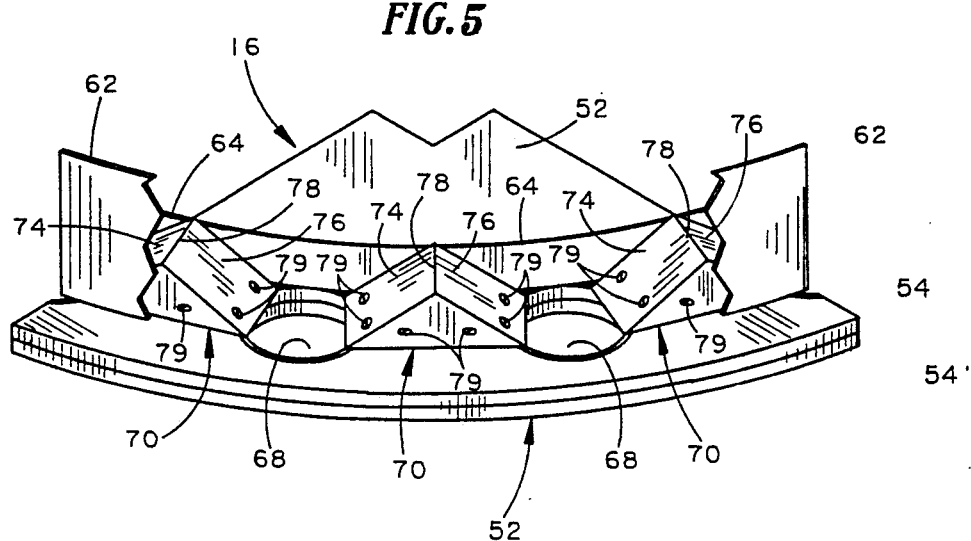
FIG. 5 is a fragmentary view of the material divider component of this invention taken from the line 5—5 of FIG. 2.

The divider assembly 16 (FIGS. 2, 3, 5, 9) includes a disc shaped base 52 of any suitable material provided with an axial opening 54 and, as shown, I have preferably formed base 52 with two layers of three quarter inch plywood 56, 56' although this is not required. Base 52 is rigidly attached to rails 38 on base 14 by bolts and nuts 58 and the diameter of base 52 is such that the perimeter thereof extends outwardly from the outermost extremities of rails 38 as best seen in FIG. 3 at 60. Base 52 includes an upstanding circular outer rim 62 and a like concentrically smaller and shorter in height inner rim 64 that provides a trough 66 between such rims of approximately five inches in width although this may be varied. In equally spaced relationship within the confines of trough 66 are a plurality of holes 68 through base 52 of approximately four and one half inches in diameter which can also be varied, and while I have used and shown (FIG. 9) some sixteen holes 68, the number of such holes is not critical and may be varied as to number and size in relation to the material being processed and the results intended. Within trough 66 and in each space between any two adjacent holes 68, there is a respective triangular deflector 70 having a thickness equal to the width of trough 66 as best seen in FIG. 5. For this purpose, the longer deflector side, or bottom, 72 abuts base 52, which serves as the bottom of the trough, and extends at opposite ends to a pair of adjacent holes 68, with the other deflector inclined sides 74,76 forming an apex point 78 planar with the top of the inner rim 64 and intermediate adjacent holes 68. Deflectors 70 are secured to base 52 in any suitable manner such as with screws 79. By this arrangement, holes 68, which will receive flowing material as will later be described in detail, are encased within trough 66 so flowing material will always be divided at point 78 and directed down deflector sides 74,76 to holes 68 since there is no trough area in which material can come to rest and accumulate. I have provided deflector sides 74,76 with an inclination of approximately one hundred forty degrees although this may be varied in any particular construction.

Figure 6A:
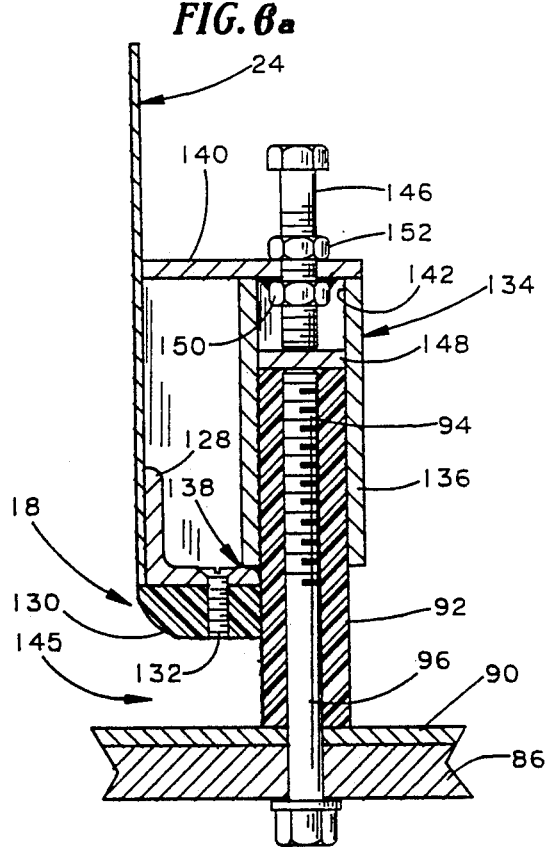
FIG. 6a is a cross sectional view of one of several like adjustable fasteners taken on the line 6a—6a in FIG. 2.
Figure 6B:
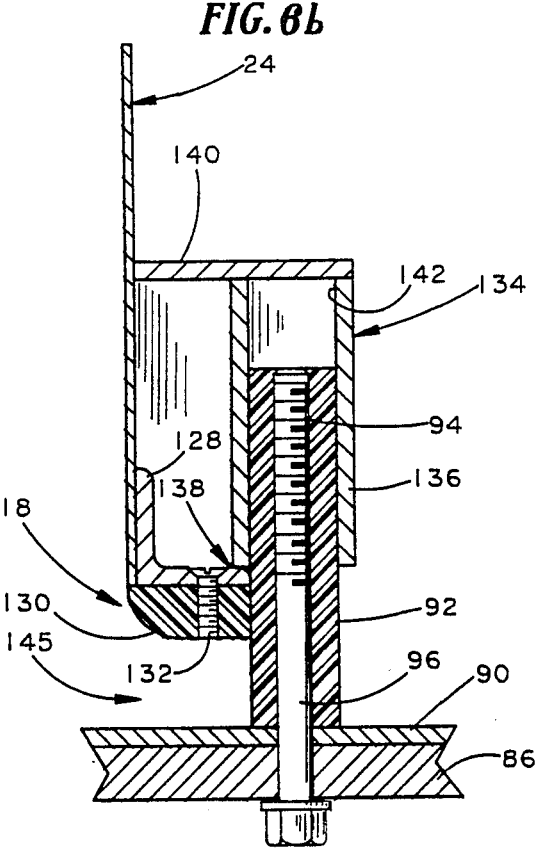
FIG. 6b is a cross sectional view of one of several auxiliary movable fasteners taken on the line 6b—6b in FIG. 2.

Assembly 18 (FIGS. 2, 3) is a single rotatable unit which I have preferably formed from a plurality of parts as will be described but which can be of one piece construction within the scope of this invention. The base or lower portion of assembly 18 includes a central steel disc 80 mounted for rotation on motor shaft 44 at hub 50 at approximately one quarter inch above rollers 40 (FIG. 3) so that in rotation, if there is an overload, disc 80 can move into contact with and receive support from such rollers. Attached to disc 80 by fasteners 82 are the lower plywood disc 84 and the juxtaposed upper concentrically larger plywood disc 86 with an axial opening 88 in such discs for hub 50. This provides a large disc defined by the perimeter of disc 86. The top surface of disc 86 is preferably covered with any suitable material 90 that will provide a long wearing surface. A plurality of upstanding plastic posts 92 (FIG. 2) are concentrically arranged in equal spaced relationship about the outer edge of disc 86 for reasons that will later appear. Such posts 92 are internally threaded 94 and secured by a bolt 96 extending upwardly through the peripheral area of disc 86 and material 90 as best seen in FIGS. 6a, 6b.

The upper portion of assembly 18 includes the inverted cone 19 that is constructed and securely affixed to disc 86 as follows. A generally circular base in the form of frame 98 is mounted to disc 86 as seen in FIG. 2 and while I have formed it by gluing together the mitered ends of a plurality of like rectangular blocks 100, this is not critical and any other suitable construction can be used. Cone 19 is formed by abutting a plurality of plywood wedge segments 102 into the self supporting relationship shown in FIG. 2. The wider ends of segments 102 correspond to the length of a block 100 in frame 98 and each such wider end is suitably secured to a respective block 100 in any suitable manner as by one or more screws 104 as best seen in FIG. 4. Frame 98 is securely affixed to disc 86 at a plurality of selected points for which purpose I have used an angle bracket 110 secured to frame 98 and to disc 86 with screws 112 as also seen in FIG. 4. By this arrangement, with cone 19 covering the major area of disc 86 and secured thereto, the peripheral area of such disc becomes in effect a peripheral flange 20 at the base of cone 19 and as seen in FIG. 3, such flange is disposed in close spaced relationship over the inner rim 64 and extends sufficiently across such rim into trough 66 so as to be in flow communication with holes 68 as will become apparent. The apex of cone 19 is provided with an opening 106 into which a small centering cone 108 is glued in a keystone fashion as seen in FIG. 3. The outer surfaces of wedge segments 102 as viewed in FIG. 2 are provided with a thin wear surface 109 of any suitable material as best seen in FIG. 4.

One of the important features of this invention resides in the construction of cone 19 where the angle of slope of the cone surface from its apex to its base is matched to the angle of repose of the particular material to be processed. Such an angle will not be the same for all materials and thus with different materials, it may be necessary to provide different cones with the appropriate inclination. For example, the average angle of repose for such materials as beans, corn, rice and flowable seeds is approximately twenty three degrees and for other materials for which such angle is not known, it must be determined so that the proper cone can be made.

A cylindrical receiving and cushioning hopper 22 (FIGS. 2, 3), open at the top 114 and bottom 116 and concentrically smaller than cone 19, is secured in spaced above concentric relationship to such cone for rotation therewith by the depending supports 118 secured to cone 19 in any suitable manner such as by screws 120.

A surge hopper 24 (FIGS. 2, 3) is also cylindrical with an open top 122 and an open bottom 124 on which are the respective peripheral flanges, 126 at top 122 and 128 at bottom 124 with a wear ring 130 of any suitable material secured to the lower flange 128 as by screws 132 (FIGS. 6a, 6b). Hopper 24 is concentrically larger than the base of cone 19 and concentrifically smaller relative to the periphery of flange 20 and is mounted to assembly 18 for rotation therewith as follows. Attached to the outer surface of hopper 24 at the bottom end 124 are a plurality of supports 134 (FIGS. 2, 3, 6a, 6b) in like spaced relationship to and in like number as the posts 92 in assembly 18. Each support 134 comprises a rectangular block 136, preferably of steel, that is welded at a bottom edge to flange 128 as at 138 and welded at the top to hopper 24 by plate 140. As seen in FIGS. 6a, 6b, block 136 extends outwardly from flange 128 from its welded portion and in this extended area, such blocks 136 are provided with a vertical bore 142 open at the bottom and closed at the top by plate 140. A strap-like guard 144 is provided for alternate blocks 136 as best seen in FIGS. 1, 2. Each support 134 registers with a respective post 92 and is journalled thereon to attach hopper 24 to assembly 18 for rotation therewith. The diameter of bores 142 is such that blocks 136 are vertically slidable on posts 92 for adjusting the spacing 145 between the lower flange 128 of hopper and flange 20 as best seen in FIGS. 3, 4. For making such adjustment (FIG. 6a), there is an adjustment bolt 146 threaded through plate 140 into bore 142 for engagement with a floating washer 148 seated on the inner end of bolt 96 on alternate supports 134, shown here as three in number although this can be varied. A nut 150 and a lock nut 152 are on bolt 146 for engagement with the outer surface of plate 140. Clockwise rotation of the adjusting bolts 146, with nut 152 loosened, will effect the upwardly slidable movement of all supports 134 to elevate hopper 24 for varying the spacing 145 as desired, at which point nut 152 is tightened. The use of adjusting bolts 146 only on alternate supports 134 has proven satisfactory for raising and lowering hopper 24 although this number of such bolts may be varied. By rotating bolts 146 counterclockwise, with nut 152 loosened, the weight of hopper 24, together with the weight of any contained material 154, (FIGS. 10a, 10b, 10c) will permit hopper 24 to move downwardly on posts 92 to any desired point of adjustment for spacing 145, such a difference in spacing being apparent in FIG. 10b as compared with FIGS. 10a, 10c.

Figure 9:
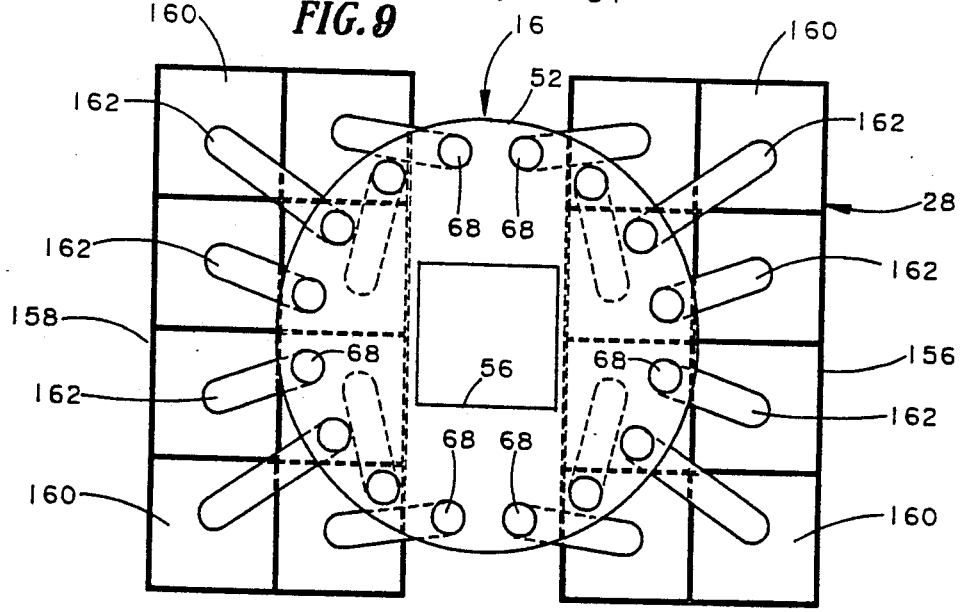
FIG. 9 is a top plan view of the receiving bins taken on the line 9—9 of FIG. 8, and FIGS. 10a, 10a and 10c are enlarged detail elevational views related respectively to the dotted circle line area 10a, 10b and 10c in FIG. 3 to more clearly show positions and movement of granular material.
Figure 8:
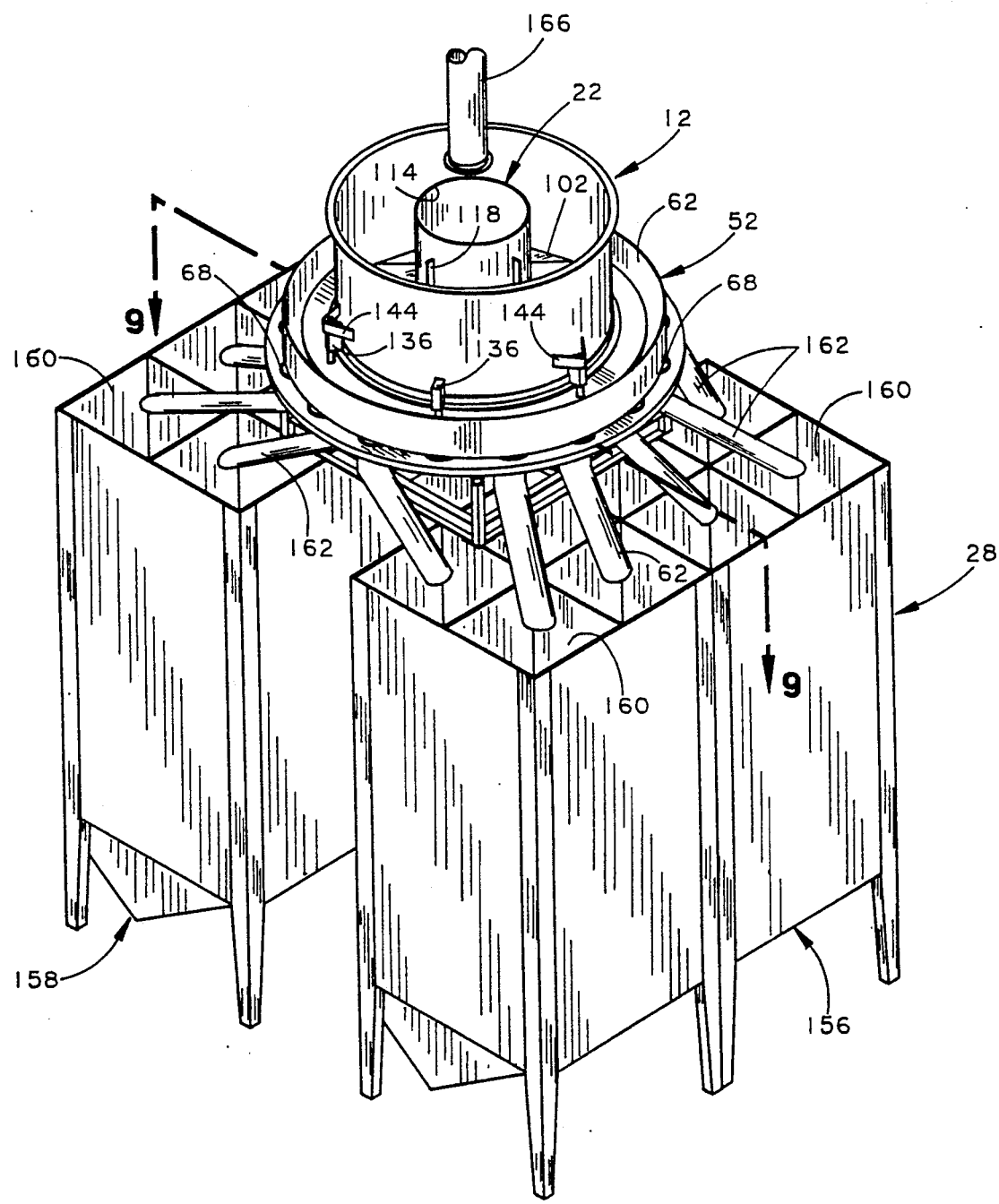
FIG. 8 is a reduced perspective view of FIG. 1 shown in operating position relative to a plurality of material receiving bins.

Material distributor 12 as thus far described is adaptable for use with any suitable material 154 receiving means for which purpose I have used a receiving bin assembly 28 as best seen in FIGS. 8, 9. As shown, assembly 28 comprises a side by side pair of box-like receptacles 156, 158 each having eight compartments 160 for a total of sixteen to complement the number of holes 68 in divider assembly 16 although, as noted earlier herein, the number of holes 68 and thus the corresponding number of compartments 160 may be varied within the scope of this invention. Selected lengths of a flexible conduit 162 are secured at one end in flow communication with a respective hole 68 by any suitable means such as a hose clamp 164 (FIG. 3) and are disposed at their other respective ends for flow communication with a respective bin compartment 160 as shown in FIGS. 8, 9. Thus constructed and arranged, distributor 12 is operated as follows.

Operation

Material 154 to be distributed to receiving points 160 is delivered by any suitable conveying means (not shown) to conduit 166 (FIG. 8) that terminates in spaced above concentric relationship to hopper 22 so that such material will flow by gravity into such hopper as best seen in FIGS. 8, 10c. Hopper 22 serves as a centering cushioning hopper relative to assembly 18 whereby as hopper 22 is filling, incoming material 154 is put into rotation to fall in an even flow upon preceding material 154 to minimize or prevent damage to such material. From hopper 22, material 154 flows by gravity out of the bottom thereof onto cone 19 and the spacing between the bottom of hopper 22 and cone 19 is such that material 154 will accumulate in hopper 22 at a rate greater than the rate of flow to cone 19 with a two-fold result. The flow out of the bottom of hopper 22 is by gravity down cone 19 to its angle of repose to create what I call a head 168 at the passageway 145 and settling area 170 (FIG. 4) and the toe 172 which terminates on flange 20 at or near the peripheral edge thereof depending upon the vertical spacing between hopper 24 and assembly 18 as best seen in FIGS. 10a, 10b, and as the angle of repose is formed, the more rapid filling of hopper 22 than the discharge therefrom results in material 154 overflowing hopper 22 to join material 154 flowing downwardly on cone 19. Material 154, when assembly 18 is stationary, comes to rest at toe 172 and will not move over the edge of flange 20 until rotation of assembly 18 has commenced. In this position, material 154 blocks all further flow through passageway 145 into holes 68.

Assembly 18 is rotated to move material 154 by centrifugal force in an even flow over the edge of flange 20 through holes 68 into compartments 160 in a manner quite different from that of prior devices. Here, the speed of rotation required is only that which will impart a centrifugal impulse sufficient to initiate motion of material 154 at the toe 172, which, as can be appreciated, will be substantially slower than a speed required to import such an impulse to initiate motion of material at the axial area in the manner shown in prior devices, and such a slower speed as required in this invention is an important factor that permits precise control of the volume and speed of the discharge of material into compartments 160 in a manner not found in prior disclosures. With the present structure, I have preferably made assembly 18 with a diameter of sixty inches determined by the periphery of flange 20 for which rotation at twenty revolutions per minute is sufficient to provide adequate movement of material 154 at toe 172 to afford precise control of material flow and a like result can be obtained by enlarging or reducing the diameter of assembly 18. Thus, whatever size diameter is used for assembly.. 18, it is only necessary to provide a rotation speed sufficient to initiate motion of material 154 at the toe 172 by centrifugal force.

As the appropriate centrifugal impulse is generated to initiate movement of material 154 at toe 172, such material begins to move over the edge of flange 20 (FIG. 10c) and the angle of repose will continually move to correct itself to produce an even flow of material 154 to divider assembly 16 that sends equal amounts of material into holes 68 and into compartments 160. Such flow may be halted nearly instantaneously by lowering the speed of the rotating assembly 18. The toe 172 may be moved in or out on flange 20 by raising or lowering hopper 24 and by adjustment of the speed of rotation and these adjustments provide precise control on the rate of flow of material 154 for direction to compartments 160. When any material distributing operation has been completed, distributor 12 can be cleared of any material that might remain in the settling area 170 by rotating assembly 18 at a sufficiently high speed for a short period of time for this purpose. Accordingly, in view of the foregoing, it is thought a full understanding of the construction and operation of this invention will be had and the advantages of the same will be appreciated.

I claim:

1. Apparatus for distributing granular material, comprising:
a base,
a material divider secured to said base,
said divider being provided with a plurality of equally spaced holes disposed in a circular pattern,
an inverted cone defining an evenly sloped surface from an elevated apex to a lower circular bottom edge,
a peripheral flange on said bottom edge,
said sloped surface having an angle of inclination matching the angle of repose of material to be distributed,
said cone adapted to receive a flow of material onto said apex for flow by gravity down said sloped surface to establish its angle of repose with a toe point at said flange,
means for mounting said cone to said base so that said flange is in spaced above relationship to said holes, and
means for rotating said cone to create only that amount of centrifugal force necessary to overcome the angle of repose at said toe point for initiating movement of material thereat in an even flow over the edge of said flange into said holes.

2. Apparatus as defined in claim 1 including respective deflector means on said divider for each respective hole for receiving material flow from said flange and directing it into said holes in an even manner.

3. Apparatus as defined in claim 1, including:
a cylindrical hopper having an open top and an open bottom end, disposed in concentric relationship to said cone, and
means for vertically adjustably securing said hopper to said flange so that said bottom end is in spaced relationship above said flange to define a flow passageway therebetween for material from said cone to said flange.

4. Apparatus as defined in claim 1, including:
a cyclindrical hopper having an open top and an open bottom end,
said hopper being disposed in concentric relationship to said cone to accumulate material flowing down said cone,
means for fastening said hopper to said flange for rotation therewith with said bottom end in spaced above parallel relationship to said flange to define a flow passageway for material from said cone to said flange, and
means for adjusting said means for fastening to selectively increase and decrease said spaced relationship between said bottom end and said flange to selectively increase and decrease the size of said passageway for selectively increasing and decreasing the volume of material flow therethrough during rotation.

5. Apparatus as defined in claim 4, including respective deflector means on said divider for each respective hole for receiving material flow from said flange and directing it into said holes in an even manner.

6. Apparatus as defined in claim 3, including respective deflector means on said divider for each respective hole for receiving material flow from said flange and directing it into said holes in an even manner.

7. Apparatus for distributing granular material, comprising:
a base,
a material divider secured to said base,
said material divider comprising:
a flat disc,
a circular upstanding inner rim and a like concentrically larger outer rim secured on said disc to define a trough area intermediate said rims,
a plurality of equally spaced material receiving holes in said disc all disposed within the confines of said trough area,
an inverted cone defining an evenly sloped surface from an elevated apex to a lower circular bottom edge provided with a peripheral flange,
said sloped surface having an angle of inclination matching the angle of repose of the material to be distributed,
means for mounting said cone to said base so that said flange extends over said inner rim into said trough area spaced above said holes,
said apex adapted to receive material for flow by gravity down said sloped surface to establish its angle of repose with a toe point at said flange, and
means for rotating said cone at a rate of speed only sufficient to create that amount of centrifugal force necessary for overcoming the angle of repose at said toe point to initiate movement of material at said toe point in an even flow over the edge of said flange into said holes.

8. Apparatus as defined in claim 7, including respective deflector means in said trought intermediate adjacent holes therein for receiving material flow from said flange and directing it in an even manner into said respective holes.

9. Apparatus as defined in claim 7, including:
a cylindrical hopper having an open top and an open bottom end, disposed on concentric relationship to said cone, and
means for vertically adjustably securing said hopper to said flange so that said bottom end is in spaced relationship above said flange to define a flow passageway therebetween for material from said cone to said flange.

10. Apparatus as defined in claim 7, including:
a cylindrical hopper having an open top and an open bottom end,
said hopper being disposed in concentric relationship to said cone to accumulate material flowing down said cone,
means for fastening said hopper to said flange for rotation therewith with said bottom end in spaced above parallel relationship to said flange to define a flow passageway for material from said cone to said flange, and
means for adjusting said means for fastening to selectively increase and decrease said spaced relationship between said bottom end and said flange to selectively increase and decrease the size of said passageway for selectively increasing and decreasing the volume of material flow therethrough during rotation.

11. A method of distributing granular material, comprising the steps of:
providing a rotatable support surface in the form of an inverted cone on which the angle of slope from the apex of the cone to the base thereof is matched to the angle of repose of the particular material to be processed,
delivering material for accumulation at its angle or repose on said support surface between said apex and said base, providing a plurality of circumferentially arranged receiving points below said base, and rotating said material at a speed to create only that amount of concentrifugal impulse necessary to overcome the angle of repose at said base to initiate movement of said material from said base to said receiving points as the angle of repose continually moves to correct itself.

12. A method as defined in claim 11, including dividing the moving material at said lowest point and directing it in equal amounts into said respective receiving points.

13. A method as defined in claim 11, including regulating the volume of material moving from said lowest point at any selected time.

14. A method as defined in claim 12, including regulating the volume of material moving from said lowest point at any selected time.

* * * * *